(12) United States Patent
Hanson et al.

(10) Patent No.: US 8,919,211 B1
(45) Date of Patent: Dec. 30, 2014

(54) FORCE-SENSITIVE OCCUPANCY SENSING TECHNOLOGY

(71) Applicants: Mark Andrew Hanson, Fairfax, VA (US); Adam T. Barth, Annandale, VA (US); Samuel Alden Ridenour, Saint Charles, IL (US); Paul Michael Wempe, Saint Charles, IL (US)

(72) Inventors: Mark Andrew Hanson, Fairfax, VA (US); Adam T. Barth, Annandale, VA (US); Samuel Alden Ridenour, Saint Charles, IL (US); Paul Michael Wempe, Saint Charles, IL (US)

(73) Assignee: Alarm.com Incorporated, Vienna, VA (US)

( * ) Notice: Subject to any disclaimer, the term of this patent is extended or adjusted under 35 U.S.C. 154(b) by 0 days.

(21) Appl. No.: 13/828,330

(22) Filed: Mar. 14, 2013

Related U.S. Application Data

(60) Provisional application No. 61/625,237, filed on Apr. 17, 2012.

(51) Int. Cl.
*G01L 1/00* (2006.01)
*G01L 1/14* (2006.01)

(52) U.S. Cl.
CPC ..................................... *G01L 1/146* (2013.01)
USPC .................................................... 73/862.626

(58) Field of Classification Search
USPC .................................................... 73/862.626
See application file for complete search history.

(56) References Cited

U.S. PATENT DOCUMENTS

| | | | | |
|---|---|---|---|---|
| 4,320,766 A * | 3/1982 | Alihanka et al. | ............... | 600/484 |
| 6,006,386 A * | 12/1999 | Mohaupt | ................... | 73/862.68 |
| 6,033,370 A * | 3/2000 | Reinbold et al. | ............. | 600/595 |
| 6,499,359 B1 * | 12/2002 | Washeleski et al. | ..... | 73/862.473 |
| 7,578,195 B2 * | 8/2009 | DeAngelis et al. | ............ | 73/718 |
| 7,719,007 B2 * | 5/2010 | Tompkins et al. | ............. | 257/48 |

* cited by examiner

*Primary Examiner* — Lisa Caputo
*Assistant Examiner* — Octavia Hollington
(74) *Attorney, Agent, or Firm* — Fish & Richardson P.C.

(57) ABSTRACT

A force-sensitive capacitive sensor that includes a first conductive plate, a second conductive plate that is spaced apart from the first conductive plate, and a compressible dielectric insulator positioned between the first conductive plate and the second conductive plate. The sensor also includes a first protective insulator, a second protective insulator sealed to the first protective insulator to encase the first conductive plate, the second conductive plate, and the compressible dielectric insulator, and a circuit attached via wires to the first conductive plate and the second conductive plate. The sensor may also include electromagnetic shielding. The circuit is configured to sense a change in capacitance between the first conductive plate and the second conductive plate caused by compression of the compressible dielectric insulator resulting from a person occupying the sensor or a support surface positioned above the sensor, and transmit output based on the sensed change in capacitance.

19 Claims, 5 Drawing Sheets

US 8,919,211 B1

FORCE-SENSITIVE OCCUPANCY SENSING TECHNOLOGY

CROSS REFERENCE TO RELATED APPLICATIONS

The present application claims the benefit of U.S. Provisional Application No. 61/625,237, filed Apr. 17, 2012, which is incorporated herein by reference in its entirety for all purposes.

TECHNICAL FIELD

This disclosure relates to capacitive occupancy sensing technology.

BACKGROUND

Recent technological advancements have facilitated the detection of occupancy on human support surfaces such as beds, cushioned seats, and non-cushioned seats (e.g., chairs and sofas) via sensors placed directly above or below the support surface (e.g., cushion or mattress). More specifically, a binary occupancy sensor produces a distinct output when a support surface is either occupied or unoccupied. Beyond support surface detection, a broad application space exists for human-centric binary occupancy sensing, ranging from safety to wellness assessment. For example, bed and seat occupancy sensors can be utilized to measure and assess sedentary behavior (e.g., time spent in bed or seat) and fall risk (e.g., bed entries and exits, time spent away from bed, etc.). Occupancy can be measured with electrically conductive contacts (e.g., electrical contact created when occupied) or more complex sensing mechanics (e.g., resistive, load cell, pressure, etc.) filtered to produce binary output.

More complex sensing elements can also measure small variations in force applied to support surfaces and provide corresponding variable output. Such sensors are typically placed above the support surface and in direct contact with the sensed body. Combined with sophisticated signal filtering and processing, diverse applications of such force-sensitive sensors range from sleep quality measurement to detection of breathing rate and sleep apnea.

SUMMARY

Techniques are described for capacitive occupancy sensing.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Techniques are described for multi-modal, capacitive, force-sensitive bed and seat sensing. The sensor's flexible form allows it to be utilized both above support surfaces (e.g., in direct contact with the sensed body) and below support surfaces (e.g., below a mattress or cushion). Furthermore, the sensor's capacitive sensing element, combined with in-sensor computational processing processes, allow for both binary occupancy detection and high precision, force-sensitive variable measurement.

Figure 1:
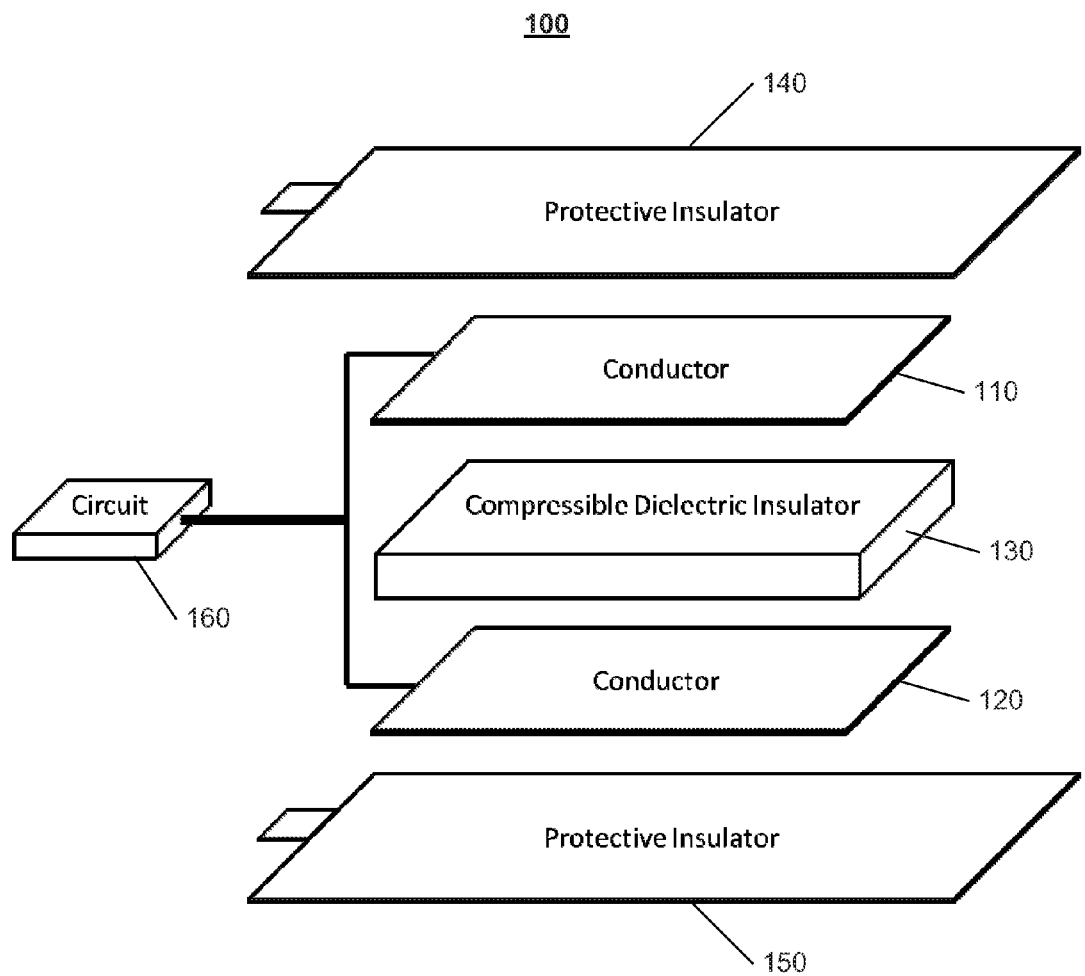
FIGS. 1 and 3 illustrate an example capacitive sensor.

FIG. 1 illustrates an example capacitive sensor 100. The capacitive sensor 100 is a multi-modal capacitive sensor that includes conductive plates 110 and 120 (made either rigid or flexible by material selection and/or supportive backing). A compressible dielectric insulator 130 is positioned between the conductive plate 110 and the conductive plate 120. A top protective insulator 140 and a bottom protective insulator 150 are sealed together to encase the components of the capacitive sensor 100. The top protective insulator 140 and the bottom protective insulator 150 may include anti-microbial or non-slip fabrics and surfaces. The conductive plates 110 and 120 may be constructed of metalized foil with optional plastic backing to enhance rigidity. The capacitive sensor 100 also may include electromagnetic shielding, which may include metal surfaces or metal plates embedded into the construction of the capacitive sensor 100. For example, electromagnetic shielding may be placed between the top protective insulator 140 and the bottom protective insulator 150. The compressible dielectric insulator 130 may be constructed of non-conductive foam. The capacitive sensor 100 also includes a computational circuit 160 attached via wires to the conductive plates 110 and 120.

The two conductive plates 110 and 120 are placed on either side of the compressible dielectric insulator 130 to construct a capacitive element influenced by external applied force. When external force (e.g., a person's weight) is applied to the sensor 100, the dielectric insulator 130 compresses, the distance between the conductive plates 110 and 120 is reduced, and the capacitance is increased. This relationship is illustrated below in Equation 1, where C is the capacitance, $\epsilon$ is the permittivity of the insulating dielectric 130, A is the area of the conductive plates 110 and 120, and d is the distance between the conductive plates 110 and 120. Provided all layers in the capacitive sensing element are flexible, the sensor 100 may be placed either above or below a cushioned support surface to detect occupancy or small variations in applied force.

$$C = \frac{\epsilon A}{d} \quad \text{Equation 1}$$

Capacitance Relationship

Figure 2:
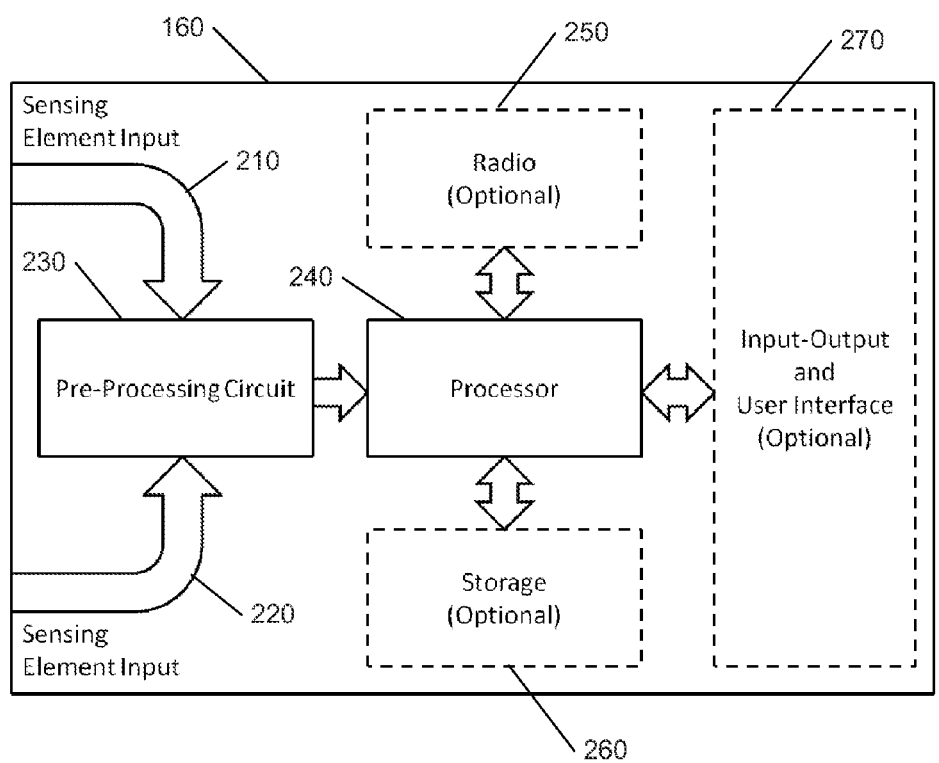
FIG. 2 is a diagram that illustrates an example circuit.

FIG. 2 illustrates an example of the circuit 160. As shown in FIG. 2, the circuit 160 includes digital and analog components that convert capacitance to a digital value. For instance, the circuit 160 includes a first sensing element input 210 that is connected to the conductive plate 110 and a second sensing element input 220 that is connected to the conductive plate 120. The circuit 160 also includes a pre-processing circuit 230 and a processor 240. The pre-processing circuit 230 receives input from the first sensing element input 210 and from the second sensing element input 220 and performs pre-processing on the received inputs. The pre-processing circuit 230 provides results of pre-processing to the processor 240. The pre-processing circuit 230 and processor 240 digitally process the signals for the conductive plates to detect occupancy or quantify small changes in externally applied force. For example, the pre-processing circuit 230 may convert sensed capacitance between the conductive plates 110 and 120 into an oscillating signal of varying frequency at digital logic levels.

Moreover, the circuit 160 may include a wireless radio 250 that transmits capacitance, occupancy, or measured externally applied force data to a remote location (e.g., a base station, a mobile device, a wireless router, etc.). The circuit 160 also may include local memory/storage 260 that stores capacitance, occupancy, or measured externally applied force data. The memory/storage 260 may temporarily store capacitance, occupancy, or measured externally applied force data prior to transmission by the wireless radio 250 to a remote location (e.g., a base station, a mobile device, a wireless router, etc.). Further, the circuit 160 may include input/output and user interface components 270 (e.g., a button and a light-emitting diode (LED)) to facilitate user interaction. Because the sensing element may be positioned below a cushioned support surface of unknown weight, user interaction may be used for sensor calibration or taring. For example, the circuit 160 may receive user input that initiates a calibration process and that indicates that no user-applied force is being provided to the sensing element. In this example, the circuit 160 may measure the weight in the unoccupied state based on receiving the user input and use the measured weight to calibrate the sensor. Calibration may promote higher accuracy measurement of external forces, such as human support surface loading.

To measure capacitance, the circuit 160 may employ various processes. For example, the circuit 160 may utilize a Schmitt-trigger along with a resistor to oscillate between digital logic levels ("0" and "1") at a frequency directly related to the sensed capacitance and the "RC time constant" created with the added resistance. In this example, the oscillating signal serves as a clock source for a counter. The difference in counter value is measured over a known period of time (obtained from another time source), and the number in the counter directly corresponds to the sensed capacitance.

In another example, the circuit 160 measures capacitance by introducing a transient input in voltage and/or current and then measuring the response to the transient input with respect to time. In this example, the circuit 160 calculates capacitance based on the measured response and time. These processes, among others, may be used to sense minute changes in capacitance with small, inexpensive, and power efficient circuitry. The power efficiency may allow the circuit 160 to be externally or battery powered.

Figure 3:
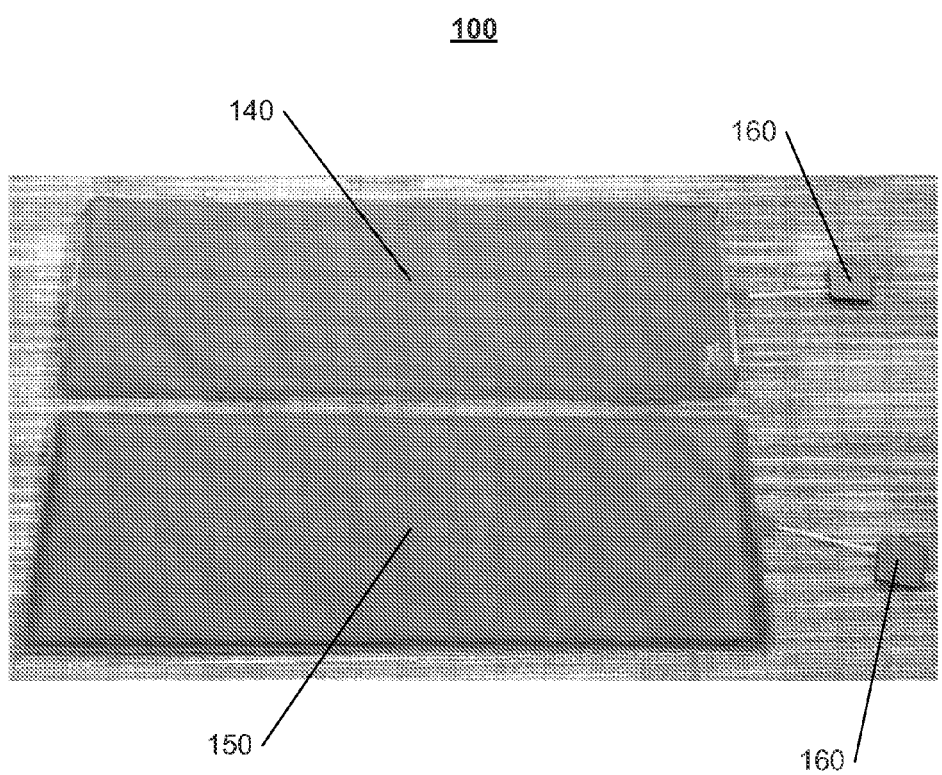

FIG. 3 illustrates an example implementation of the capacitive sensor 100 with both top and bottom views being shown. As shown in the top view, the top protective insulator 140 defines an external top surface of the capacitive sensor 100. As shown in the bottom view, the bottom protective insulator 150 defines an external bottom surface of the capacitive sensor 100. The circuit 160 is positioned within a circuit box, which is exposed. Wires connect the circuit 160 to the conductive plate 110 and the conductive plate 120, which are positioned between and covered by the top protective insulator 140 and the bottom protective insulator 150.

Figure 4:
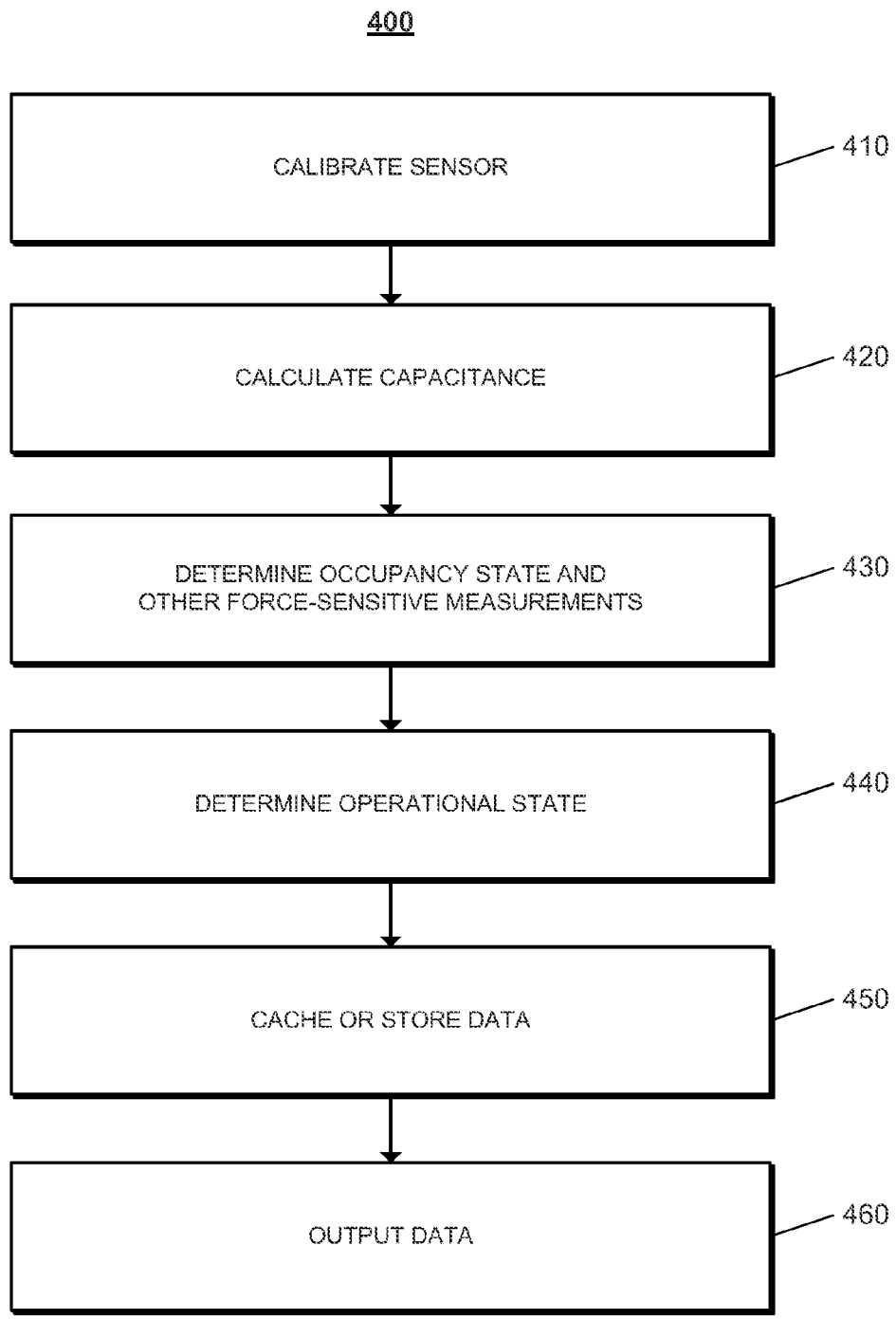
FIG. 4 is a flow chart illustrating an example process.

FIG. 4 illustrates an example process 400 for occupancy sensing. The operations of the example process 400 are described generally as being performed by the circuit 160. In some implementations, operations of the example process 400 may be performed by one or more processors included in one or more electronic devices. As shown in FIG. 4, the circuit 160 provides computational capabilities to calibrate or tare the sensor (410), calculate capacitance (420), determine occupancy state or other force-sensitive measures (430), determine operational state (440), cache or store data (450), and transmit data off of the sensor (e.g., wirelessly) (460).

The circuit 160 calibrates or tares the sensor 100 (410). The sensor 100 may be tared manually or automatically. To tare the sensor 100 manually, the circuit 160 determines that the sensor 100 is unoccupied based on receiving user input (e.g., a press of a button on the computational circuit device) or based on receiving, from another electronic device, a signal that initiates a calibration process (e.g., a wirelessly received command). Upon initiation of the calibration process, the circuit 160 determines a capacitance measured by the circuit 160 in the unoccupied state and uses the determined capacitance as a baseline measurement for calibrating the sensor 100. Sensor calibration may be performed periodically, as the unoccupied capacitance value may change over time (e.g., due to small differences in load distribution and material-induced hysteresis of both the cushioned support surface and the compressible insulator between the conductive plates). The circuit 160 may automatically perform periodic calibration without requiring user input or an outside signal to initiate the calibration.

Other processes of automatic calibration or taring also may be employed without the use of manual or command-initiated device input. For example, capacitance values may be statistically profiled and unsupervised machine learning processes may be implemented to classify occupancy state.

After the sensor 100 has been calibrated, the circuit 160 calculates capacitance (420). To measure capacitance, the circuit 160 may employ various processes. For example, the circuit 160 may utilize a Schmitt-trigger along with a resistor to oscillate between digital logic levels ("0" and "1") at a frequency directly related to the sensed capacitance and the "RC time constant" created with the added resistance. In this example, the oscillating signal serves as a clock source for a counter. The difference in counter value is measured over a known period of time (obtained from another time source), and the number in the counter directly corresponds to the sensed capacitance.

In another example, the circuit 160 measures capacitance by introducing a transient input in voltage and/or current and then measuring the response to the transient input with respect to time. In this example, the circuit 160 calculates capacitance based on the measured response and time.

The circuit 160 may calculate a change in capacitance by computing a difference between the measured capacitance and the baseline capacitance measured during calibration. The circuit 160 may use the change in capacitance to measure the force applied to the sensor 100 by a user.

After the circuit 160 calculates capacitance, the circuit 160 determines an occupancy state and other force-sensitive measurements (430). For instance, the circuit 160 may determine a binary occupancy state (e.g., occupied or not occupied) based on the calculated capacitance and also may determine high precision, force-sensitive measurements based on the calculated capacitance. The circuit 160 may determine the high precision, force-sensitive measurements by translating the calculated capacitance to force applied to the sensor 100. The force may be calculated by determining a force-capacitance equivalence function at design time or at build time. The function may be determined by applying external loads of known forces to the sensor 100 and measuring the sensor 100 output capacitance. The force-capacitance equivalence function may be represented as an interpolation of the known loads and measured capacitances. The circuit 160 may calculate the force using this equivalence function or estimate the force using a capacitance to force lookup table stored on the processor 240 or in storage 260.

The circuit 160 may use various processes to determine the binary occupancy state. For instance, the circuit 160 may detect occupancy based on measuring a force greater than a threshold and detect a lack of occupancy based on measuring a force less than the threshold. To reduce false activations or deactivations, a process may be deployed on the embedded circuit 160 (e.g., on a processor or microcontroller) to manage small variations. The process is explained below with respect to FIG. 5.

Figure 5:
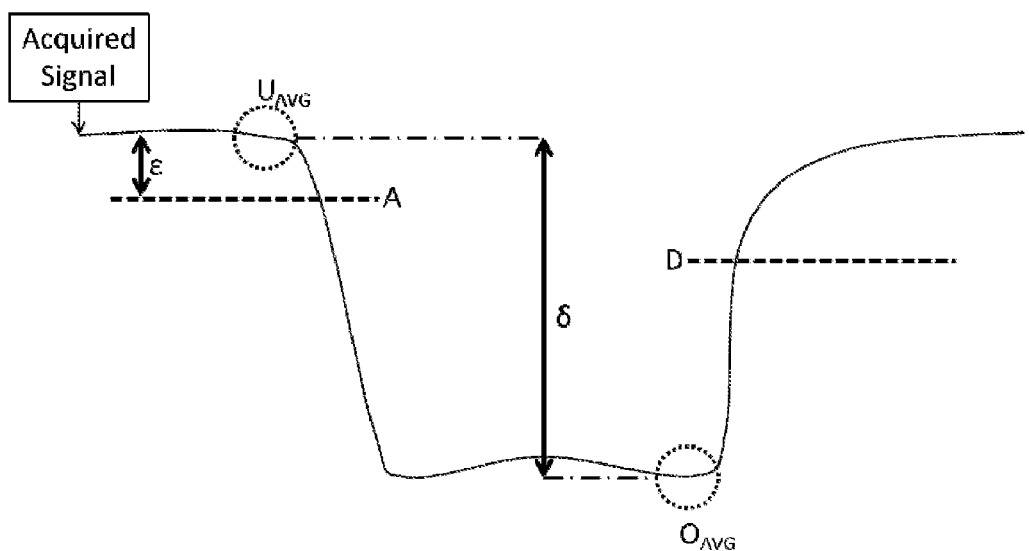
FIG. 5 illustrates an example signal.

FIG. 5 illustrates an example signal corresponding to a transition to, and back from, an occupied state with notations for relevant variables. Sampled values corresponding to the unoccupied state are averaged over a number of samples (denoted as T) to subtract small changes in applied force and noise from both the electrical and mechanical systems. Therefore, at any time t, the process has an estimate of the average acquired signal in the unoccupied state ($U_{AVG}$). Another value $\epsilon$ is defined as the amount of signal change required for activation. An activation threshold A is set as described in Equation 2. Consequently, the activation threshold is updated on the time interval of T to compensate for small changes in force, and therefore sensed capacitance, corresponding to the unoccupied state.

$$A = U_{AVG} - \epsilon \quad \text{Equation 2: Activation Threshold Equation}$$

Once the signal crosses the activation threshold for a pre-defined number of samples, sampled values corresponding to the occupied state are averaged over T samples to continually update the "occupied signal average" ($O_{AVG}$), and $U_{AVG}$ is no longer calculated while in the occupied state. Additionally, for each update of $O_{AVG}$, the difference between the most recent $U_{AVG}$ and $O_{AVG}$ is calculated and stored in a variable denoted as $\delta$. Similar to the activation threshold, a deactivation threshold (D) is set. Unlike the activation threshold, however, this new threshold is set relative to the recovering proportion ($\alpha$) expressed as a number between 0 and 1. This relationship is expressed in Equation 3. After the signal crosses the deactivation threshold for a pre-defined number of samples, operation resumes as previously described for the unoccupied state.

$$D = O_{AVG} + \delta \cdot \alpha \quad \text{Equation 3: Activation Threshold Equation}$$

This process to set the activation and deactivation thresholds, combined with the ability to manually set $U_{AVG}$ using a button interface or other tare initiation mechanism, allows the sensor system to detect occupancy in a multitude of scenarios with unknown support surface and subject weights. In the unoccupied state, the circuit 160 compares the measured capacitance to the activation threshold and determines that the sensor 100 is occupied based on the comparison revealing that the measured capacitance meets the activation threshold. Based on the determination that the sensor 100 is occupied, the circuit 160 moves to the occupied state and begins comparing measured capacitance to the deactivation threshold. Based on the comparison revealing that the measured capacitance exceeds the deactivation threshold, the circuit 160 determines that the sensor 100 is not occupied. Based on the determination that the sensor 100 is not occupied, the circuit 160 returns to the unoccupied state and resumes comparing measured capacitance to the activation threshold. The process continues in this manner as the circuit 160 detects occupancy and lack of occupancy.

In some implementations, in addition to binary occupancy state, different force measurements may be determined at different locations across the sensor 100. In these implementations, the sensor 100 is capable of localizing force measurements to specific regions of the sensor surface. For instance, the sensor 100 may include multiple sensing outputs provided for each of the conductors. Each of the multiple sensing outputs may be associated with a specific region of the sensor surface and may be analyzed to provide a force (e.g., capacitance) measurement for the specific region.

In other examples, the conductors may be divided into multiple, separate plates across the sensor surface. In these examples, a force (e.g., capacitance) measurement may be taken for each pair of separate plates and, therefore, different force measurements may be determined at different locations across the sensor 100.

The different force measurements may be used to determine a distribution of force across the sensor 100. The distribution of force across the sensor 100 may provide additional data as compared to occupancy state alone and may be analyzed to detect various conditions. For instance, the distribution of force may be analyzed to assess risk for pressure ulcer when occupying the sensor 100. In addition, the distribution of force may be analyzed for changes to determine whether a person is restless when occupying the sensor 100 (e.g., restless during sleep), even though the sensor 100 remains occupied. The sensor 100 could also be used to measure forces exerted by multiple individuals occupying the same mattress.

The circuit 160 determines operational state of various components of the sensor 100 (440). For instance, the circuit 160 may determine a battery state of the circuit 160 battery. The circuit 160 also may detect when various trouble conditions arise within the sensor 100 (e.g., a connection to a conductive plate of the sensor is lost). The circuit 160 may determine any measurable operational state of any of the components of the sensor 100 or circuit 160 and use the one or more measured operational states to proactively address any detected trouble conditions or to attempt prevention of trouble conditions before they arise.

The circuit 160 caches or stores data 100 (450). For instance, the circuit 160 may store values related to the taring or calibration process, in addition to state variables describing the sensor's operation state (e.g., battery state, trouble conditions, etc.). The circuit 160 also may store measured capacitance values, determined occupancy states, and/or other force measurements. The circuit 160 may store any data measured or determined by the circuit 160. The storage may be temporary and deleted after the data is transmitted to an external device.

The circuit 160 outputs data from the sensor 100 (460). For example, the circuit 160 may communicate to a user or transmit to an external device values related to the taring or calibration process, in addition to state variables describing the sensor's or circuit's operation state (e.g., battery state, trouble conditions, etc.). The circuit 160 also may communicate to a user or transmit to an external device measured capacitance values, determined occupancy states, and/or other force measurements. The circuit 160 may continuously or periodically transmit data collected by the circuit 160. In some examples, the circuit 160 may delay transmission until the storage on the circuit 160 is nearly full (e.g., within a threshold storage amount of being full) and then transmit all of the stored data. In addition, the circuit 160 may transmit data upon request or may have rules that define when data should be transmitted based on the values measured. For instance, the circuit 160 may transmit data to indicate a measured force above a threshold value, a determined change in occupancy state, or a particular occupancy state that lasts more than a threshold period of time. Any rules may be set to determine when the circuit 160 transmits data and what data the circuit 160 transmits. For example, the circuit 160 may predict occupancy states and only transmit measured occupancy states that differ from predicted states.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A force-sensitive capacitive sensor comprising:
a first conductive plate;
a second conductive plate that is spaced apart from the first conductive plate;
a compressible dielectric insulator positioned between the first conductive plate and the second conductive plate;
a first protective insulator;
a second protective insulator sealed to the first protective insulator to encase the first conductive plate, the second conductive plate, and the compressible dielectric insulator; and
a circuit attached via wires to the first conductive plate and the second conductive plate, the circuit being configured to:
when the force-sensitive capacitive sensor is positioned below a support surface, sense a change in capacitance between the first conductive plate and the second conductive plate caused by compression of the compressible dielectric insulator resulting from a person occupying the support surface, and
transmit output based on the sensed change in capacitance between the first conductive plate and the second conductive plate,
wherein the circuit is configured to detect a binary occupancy state of the support surface based on the sensed change in capacitance between the first conductive plate and the second conductive plate and transmit the detected binary occupancy state, and
wherein the circuit is configured to detect the binary occupancy state of the support surface by:
determining an average acquired signal in an unoccupied state by averaging, over a first number of samples, values of measured capacitance between the first conductive plate and the second conductive plate;
setting an activation threshold based on the average acquired signal in the unoccupied state and a value that defines an amount of signal change required for activation;
after setting the activation threshold, determining that a signal representative of measured capacitance between the first conductive plate and the second conductive plate has crossed the activation threshold for a pre-defined number of samples;
based on the determination that the signal representative of measured capacitance between the first conductive plate and the second conductive plate has crossed the activation threshold, detecting occupancy of the support surface;
determining an average acquired signal in an occupied state by averaging, over a second number of samples, values of measured capacitance between the first conductive plate and the second conductive plate;
setting a deactivation threshold based on the average acquired signal in the occupied state and a difference between the average acquired signal in the unoccupied state and the average acquired signal in the occupied state;
after setting the deactivation threshold, determining that the signal representative of measured capacitance between the first conductive plate and the second conductive plate has crossed the deactivation threshold for a pre-defined number of samples; and
based on the determination that the signal representative of measured capacitance between the first conductive plate and the second conductive plate has crossed the deactivation threshold, detecting a lack of occupancy of the support surface.

2. The force-sensitive capacitive sensor of claim 1, wherein the circuit is configured to measure capacitance between the first conductive plate and the second conductive plate and transmit the measured capacitance between the first conductive plate and the second conductive plate.

3. The force-sensitive capacitive sensor of claim 1, wherein the circuit is configured to measure capacitance between the first conductive plate and the second conductive plate, translate the measured capacitance to force applied to the force-sensitive capacitive sensor, and transmit the force applied to the force-sensitive capacitive sensor.

4. The force-sensitive capacitive sensor of claim 1, wherein setting the activation threshold based on the average acquired signal in the unoccupied state and the value that defines the amount of signal change required for activation comprises setting the activation threshold as the average acquired signal in the unoccupied state minus the value that defines the amount of signal change required for activation.

5. The force-sensitive capacitive sensor of claim 1, wherein setting the deactivation threshold based on the average acquired signal in the occupied state and the difference between the average acquired signal in the unoccupied state and the average acquired signal in the occupied state comprises setting the deactivation threshold as the average acquired signal in the occupied state plus the difference between the average acquired signal in the unoccupied state and the average acquired signal in the occupied state multiplied by a proportion expressed as a number between 0 and 1.

6. The force-sensitive capacitive sensor of claim 1, wherein the activation threshold differs from the deactivation threshold.

7. The force-sensitive capacitive sensor of claim 1, wherein the first number of samples equals the second number of samples.

8. The force-sensitive capacitive sensor of claim 1, wherein the circuit is configured to calibrate the force-sensitive capacitive sensor by determining that the support surface is unoccupied based on user input, measuring capacitance in the unoccupied state, and using the measured capacitance as a baseline measurement for calibrating the force-sensitive capacitive sensor.

9. The force-sensitive capacitive sensor of claim 1, wherein the circuit comprises a wireless radio configured to transmit the output wirelessly to a remote location.

10. The force-sensitive capacitive sensor of claim 1, wherein the circuit includes electronic storage configured to store data based on the sensed change in capacitance between the first conductive plate and the second conductive plate and the circuit is configured to transmit the output based on the data stored in the electronic storage.

11. The force-sensitive capacitive sensor of claim 1, wherein the support surface is a mattress and the circuit is configured to, when the force-sensitive capacitive sensor is positioned below the mattress, sense a change in capacitance between the first conductive plate and the second conductive plate caused by compression of the compressible dielectric insulator resulting from a person occupying the mattress.

12. The force-sensitive capacitive sensor of claim 1, wherein the first conductive plate, the second conductive plate, the compressible dielectric insulator, the first protective insulator, and the second protective insulator are all flexible such that the force-sensitive capacitive sensor is flexible.

13. The force-sensitive capacitive sensor of claim 1, wherein the first protective insulator and the second protective insulator include anti-microbial fabrics and surfaces.

14. The force-sensitive capacitive sensor of claim 1, wherein the first protective insulator and the second protective insulator include non-slip fabrics and surfaces and encapsulate electromagnetic shielding.

15. The force-sensitive capacitive sensor of claim 1, wherein the first conductive plate and the second conductive plate are constructed of metalized foil.

16. The force-sensitive capacitive sensor of claim 15, wherein with the first conductive plate and the second conductive plate include plastic backing to enhance rigidity of the metalized foil.

17. The force-sensitive capacitive sensor of claim 1, wherein the compressible dielectric insulator is constructed of a medium density, non-conductive foam.

18. A method comprising:
sensing, by a circuit of a force-sensitive capacitive sensor and based on the force-sensitive capacitive sensor being positioned below a support surface, a change in capacitance between a first conductive plate of the force-sensitive capacitive sensor and a second conductive plate force-sensitive capacitive sensor caused by compression of a compressible dielectric insulator resulting from a person occupying the support surface, the compressible dielectric insulator being positioned between the first conductive plate and the second conductive plate;
detecting, by the circuit, a binary occupancy state of the support surface based on the sensed change in capacitance between the first conductive plate and the second conductive plate; and
transmitting, by the circuit, the detected binary occupancy state,
wherein detecting the binary occupancy state of the support surface comprises:
determining an average acquired signal in an unoccupied state by averaging, over a first number of samples, values of measured capacitance between the first conductive plate and the second conductive plate;
setting an activation threshold based on the average acquired signal in the unoccupied state and a value that defines an amount of signal change required for activation;
after setting the activation threshold, determining that a signal representative of measured capacitance between the first conductive plate and the second conductive plate has crossed the activation threshold for a pre-defined number of samples;
based on the determination that the signal representative of measured capacitance between the first conductive plate and the second conductive plate has crossed the activation threshold, detecting occupancy of the support surface;
determining an average acquired signal in an occupied state by averaging, over a second number of samples, values of measured capacitance between the first conductive plate and the second conductive plate;
setting a deactivation threshold based on the average acquired signal in the occupied state and a difference between the average acquired signal in the unoccupied state and the average acquired signal in the occupied state;
after setting the deactivation threshold, determining that the signal representative of measured capacitance between the first conductive plate and the second conductive plate has crossed the deactivation threshold for a pre-defined number of samples; and
based on the determination that the signal representative of measured capacitance between the first conductive plate and the second conductive plate has crossed the deactivation threshold, detecting a lack of occupancy of the support surface.

19. A circuit for a force-sensitive capacitive sensor, the circuit being configured to perform operations comprising:
sensing, based on the force-sensitive capacitive sensor being positioned below a support surface, a change in capacitance between a first conductive plate of the force-sensitive capacitive sensor and a second conductive plate force-sensitive capacitive sensor caused by compression of a compressible dielectric insulator resulting from a person occupying the support surface, the compressible dielectric insulator being positioned between the first conductive plate and the second conductive plate;
detecting a binary occupancy state of the support surface based on the sensed change in capacitance between the first conductive plate and the second conductive plate; and
transmitting the detected binary occupancy state,
wherein detecting the binary occupancy state of the support surface comprises:

determining an average acquired signal in an unoccupied state by averaging, over a first number of samples, values of measured capacitance between the first conductive plate and the second conductive plate;

setting an activation threshold based on the average acquired signal in the unoccupied state and a value that defines an amount of signal change required for activation;

after setting the activation threshold, determining that a signal representative of measured capacitance between the first conductive plate and the second conductive plate has crossed the activation threshold for a pre-defined number of samples;

based on the determination that the signal representative of measured capacitance between the first conductive plate and the second conductive plate has crossed the activation threshold, detecting occupancy of the support surface;

determining an average acquired signal in an occupied state by averaging, over a second number of samples, values of measured capacitance between the first conductive plate and the second conductive plate;

setting a deactivation threshold based on the average acquired signal in the occupied state and a difference between the average acquired signal in the unoccupied state and the average acquired signal in the occupied state;

after setting the deactivation threshold, determining that the signal representative of measured capacitance between the first conductive plate and the second conductive plate has crossed the deactivation threshold for a pre-defined number of samples; and based on the determination that the signal representative of measured capacitance between the first conductive plate and the second conductive plate has crossed the deactivation threshold, detecting a lack of occupancy of the support surface.

* * * * *